United States Patent [19]

Moseley et al.

[11] Patent Number: 4,779,224
[45] Date of Patent: Oct. 18, 1988

[54] IDENTITY VERIFICATION METHOD AND APPARATUS

[76] Inventors: Donald R. Moseley; Robert D. Drew, Jr., both of Optimum Elecrtronics, Inc., 425 Washington Ave., North Haven, Conn. 06473

[21] Appl. No.: 710,996

[22] Filed: Mar. 12, 1985

[51] Int. Cl.$^4$ ............................ G06F 7/04; G06F 7/58
[52] U.S. Cl. ......................................................... 364/900
[58] Field of Search ................................ 364/200, 900

[56] References Cited

U.S. PATENT DOCUMENTS

| | | | |
|---|---|---|---|
| 4,227,253 | 10/1980 | Ehrsam et al. | 364/200 |
| 4,310,720 | 1/1982 | Check, Jr. | 364/900 |
| 4,484,306 | 11/1984 | Kulczyckyj et al. | 364/900 |
| 4,554,418 | 11/1985 | Toy | 364/900 |

*Primary Examiner*—Gareth D. Shaw
*Assistant Examiner*—Kevin A. Kriess

[57] ABSTRACT

A method and apparatus for verifying the identity of an authorized remote user terminal for access to a base computer over a telephone line comprising providing the authorized user terminal with a programmed preselected algorithm, generating a random number at the base computer system to be accessed and transmitting the random number to the remote user terminal, performing the algorithm on the random number at the remote user terminal to calculate a first result, transmitting the first result from the remote user terminal to the base computer system, performing the algorithm on the random number at the base computer system to calculate a second result, comparing the first result and the second result and granting access to the base computer when the first result matches the second result.

9 Claims, 5 Drawing Sheets

IDENTITY VERIFICATION METHOD AND APPARATUS

BACKGROUND AND SUMMARY OF THE INVENTION

This invention relates to identity verification and is particularly concerned with computer system security and a method and apparatus for identity verification of remote user terminals.

The unauthorized access of remote user terminals via modems and telephone lines to central computer systems and data bases presents a significant data security problem. Generally, data communication equipment includes a modem at the central computer and a dial-up modem at the remote user terminal. Establishing communication with the central computer by the remote user terminal generally comprises the following preliminary procedure. The remote user dials the telephone number associated with the base modem connected to the central computer. The base modem answers the telephone call and returns a distinctive tone to the caller. The caller then attaches his remote modem to the telephone. The remote modem returns a "carrier" signal to the base modem. The base modem in turn sends a "carrier detect" signal to the computer. The computer then sends a "request to send" signal to the base modem and the base modem in turn sends a "carrier" signal to the remote modem. The remote modem in turn sends a "carrier detect" signal to the remote terminal and the remote terminal is now on line with the computer and is able to communicate directly with the computer.

In many current systems, the remote user needs to enter after coming on line a log-on sequence of characters, i.e., a password, in order to open a conversation with the computer. This group of characters or password is unique to each user and is intended to prevent unauthorized access to the computer's data base. However, such password-type data security has proved to be inadequate for several reasons. First, the log-on sequences for most mainframe computers are widely known and thus an unauthorized user need only learn the password character sequence in order to access the computer. The password may be obtained in various ways. For example, most users require simple passwords which are easily determined because they are related to someone's name such as the user's wife, children, etc. Since the log-on sequence is generally forgiving and will allow an unauthorized user to try successive passwords, repeated and varied attempts may be made to determine the authorized password.

Additionally, many manufacturers store "test" passwords in computers prior to shipment and, in many cases, these test passwords are not changed by the user and remain in the computer. Consequently, knowledgeable users will utilize these test passwords to obtain access to the computer in a manner commonly referred to as the "back door" technique. Breakthrough generators are generally available to automate repeated attempts to determine the password.

A common security measure to prevent unauthorized access is the "call back" method. In the "call back" method, the remote user makes telephone contact as previously described and submits a password. The telephone connection between the remote user and the central computer is terminated and, if a valid password has been submitted to the central computer, an automatic dialer dials a predetermined number for the remote user to reconnect the remote user to the central computer and grant access. Therefore, in addition to password protection, the computer security system insures that the remote user is at a predetermined telephone number.

The "call back" method has several limitations. First, the verification and access operation is somewhat time-consuming in that it involves making two separate long distance telephone connections. Secondly, there are additional costs for the call back telephone call and these costs are allocated to the telephone services of the central computer rather than the remote user. In data base services, it is desirable to directly allocate such costs to the remote user. Thirdly, the "call back" method does not conveniently lend itself to portable remote terminals such as those used by traveling personnel.

It is the object of the present invention to provide a new and improved method for identity verification.

Another object of the invention is to provide a method and apparatus for verifying the identity of remote user terminals for a central computer system.

A further object of the invention is to provide an identity verification method and apparatus for computer systems which is virtually impervious to unauthorized users.

A still further object of the invention is to provide a method of verification of the identity of remote user terminals which is fast and economical, and maintains direct allocation of long distance telephone costs on the remote user.

Yet another object of the invention is to provide an apparatus for verifying the identify of remote user terminals which functions externally to the computer and blocks out any communication with the computer prior to identify verification.

A further object of the invention is to provide computer security system which is reliable and convenient to operate.

It has been found that the foregoing advantages and benefits are attained in a method and apparatus for verifying the identify of an authorized remote user terminal for access to a base computer over a telephone line. The method includes providing the authorized remote user terminal with a programed preselected mathematical algorithm. A random number is generated at the base computer system to be accessed and transmitted to the remote user terminal. The algorithm is performed on the random number at the remote user terminal to calculate a first result. The first result is transmitted from the remote user terminal to the base computer system. The algorithm is performed on the random number at the base computer system to calculate a second result. The first result is compared to the second result and access to the base computer is granted when the first result matches the second result. The method may also include providing the authorized user terminal with a preselected constant and performing the algorithm at the remote user terminal on the random number and the preselected constant to calculate a first result. The algorithm is also performed at the base computer system on the random number and the preselected constant to calculate the second result.

The apparatus for verifying the identify of an authorized remote user terminal includes as base verifying unit interconnected between the base computer and base modem for selectively conducting data between the computer and base modem and a cooperating remote verifying unit interconnected between the remote user terminal and the remote modem. The base verifying unit includes microprocessor means for generating a random number and transmitting the random number to the remote verifying unit and for performing a predetermined mathematical algorithm on the random number to calculate a first result. The base verifying unit also includes means for receiving a second result from the remote verifying unit and comparing the second result to the first result. Control means is provided for controlling the conduction of data to the computer to prevent the conduction of data from the remote user terminal to the computer absent the second calculated result matching the first calculated result and permitting the conduction of data to the computer upon said second calculated result matching said first calculated result. The remote verifying unit includes microprocessor means for receiving the random number from the base verifying unit and performing the predetermined mathematical algorithm on the random number to calculate a second result. The remote verifying unit also includes means for transmitting the calculated second result to the base verifying unit. The base verifying unit and the remote verifying unit can also be provided with a predetermined constant wherein the microprocessor means for performing the predetermined mathematical algorithm comprises means for performing the mathematical algorithm on the random number and the constant to calculate the first and second results respectively.

In a further embodiment of the invention, a method for one member of a group to verify the identify of another member of the group to the exclusion of non-members includes providing each member of the group with a preselected mathematical algorithm. A random number is generated at one member and transmitted to the other member. The mathematical algorithm is performed on the random number at the one member to calculate a first result. The mathematical algorithm is also performed on the random number at the other member to calculate a second result. The second result is transmitted from the other member to the one member and the first and second results are compared whereby a match between the first and second results verifies the identity of the other member as a member of the group.

In a further embodiment of the invention, a method for determining and communicating a data encryption key from one member of a select group to another member of the select group includes providing each member of the select group with a predetermined selected mathematical algorithm. A random number is generated at one member and transmitted to another member. The mathematical algorithm is performed on the random number at the one member to determine a result which comprises the data encryption key. The mathematical algorithm is performed on the random number at the other member to also determine the result, i.e, the data encryption key, whereby the data encryption key is determined at both the one member and the other member for use in encrypting and decrypting information for communication between the members.

DESCRIPTION OF THE PREFERRED EMBODIMENT

Figure 1:
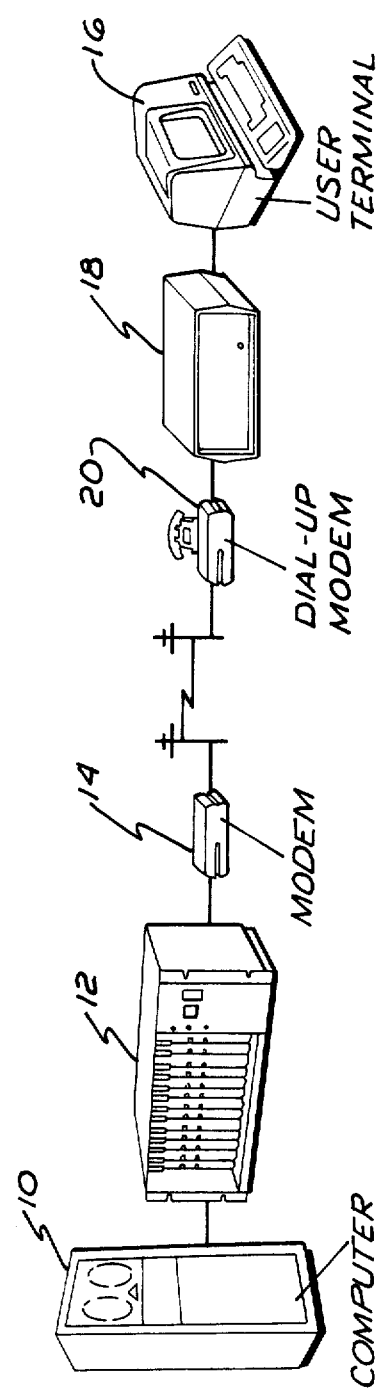
FIG. 1 is a diagramatic schematic view of the computer security system of the present invention.

Referring to FIG. 1, the identity verification apparatus of the present invention is shown in the context of a computer system interconnected by telephone with a remote user terminal. It is understood however that the identity verification method and apparatus of the present invention has wide application and utility in many areas where identification of group members is required and is also particularly applicable to encryption key management as noted more fully hereinafter.

The computer system of FIG. 1 includes a central computer 10, a central or base verifying unit 12, a central or base modem 14, a remote user terminal 16, a remote verifying unit 18, and a remote dial-up modem 20. The computer 10, modems 14, 20, and the remote user terminal 16 are conventional equipment and need not be described in detail.

Figure 2:
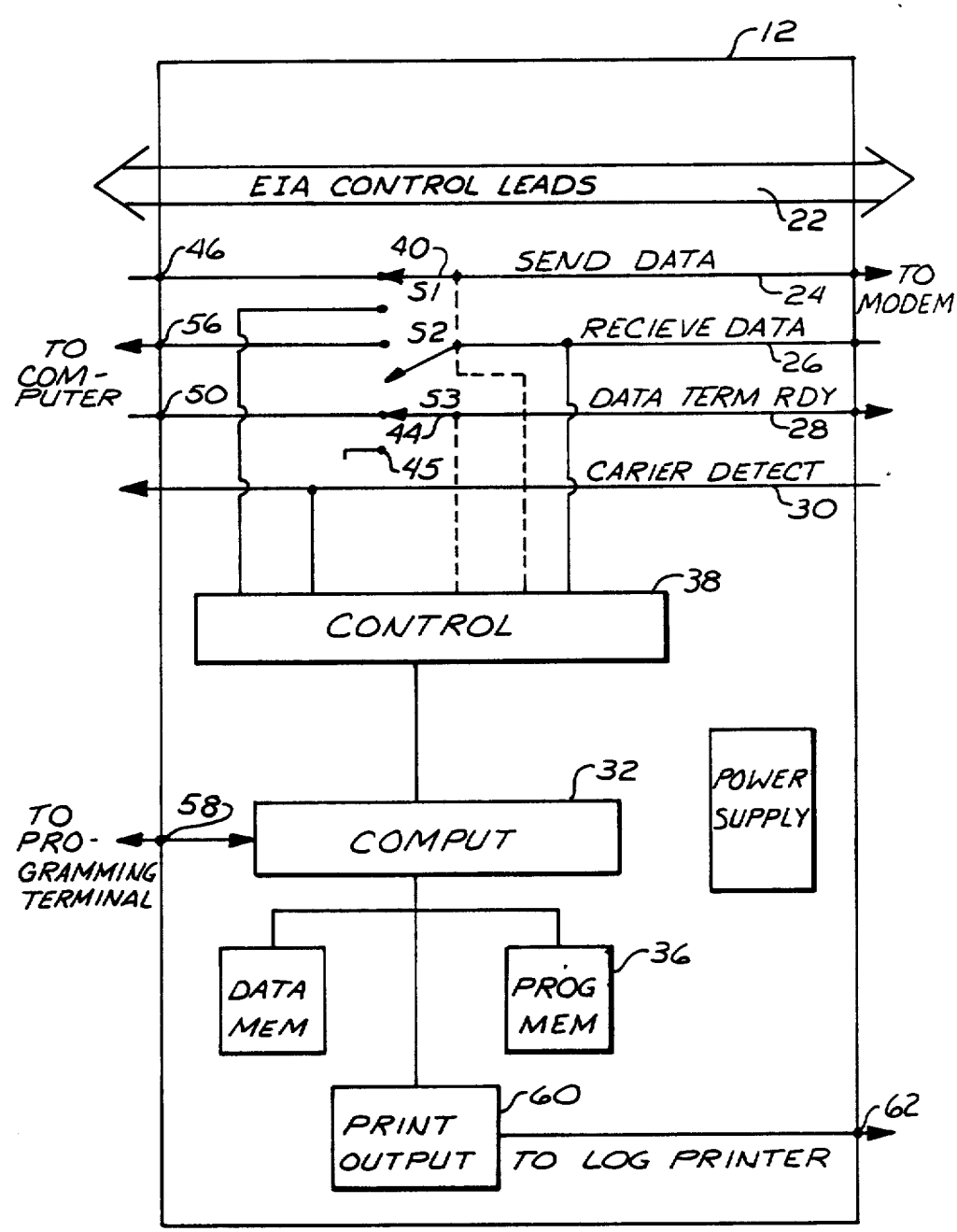
FIG. 2 is a block diagram of the central verifying unit of the present invention.
Figure 4:
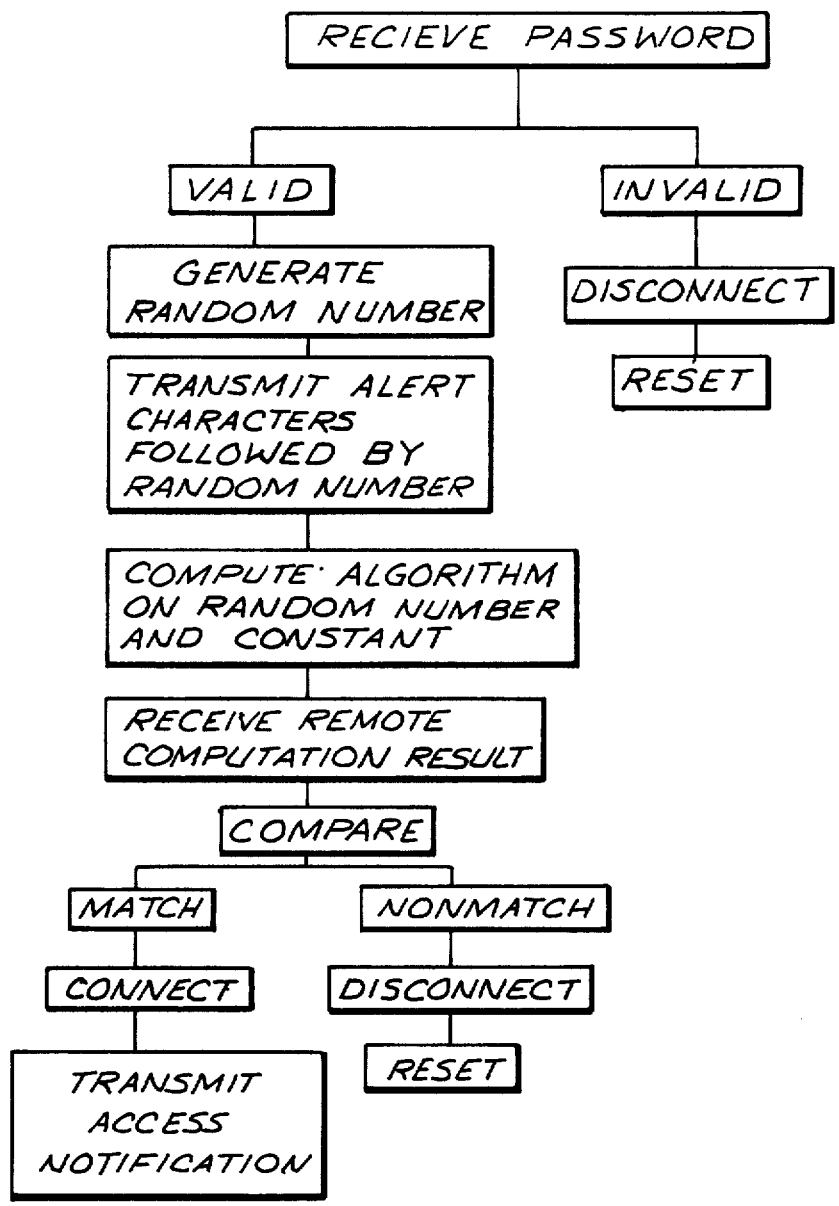
FIG. 4 is a data flow diagram relative to the central verifying unit of FIG. 2.
Figure 5:
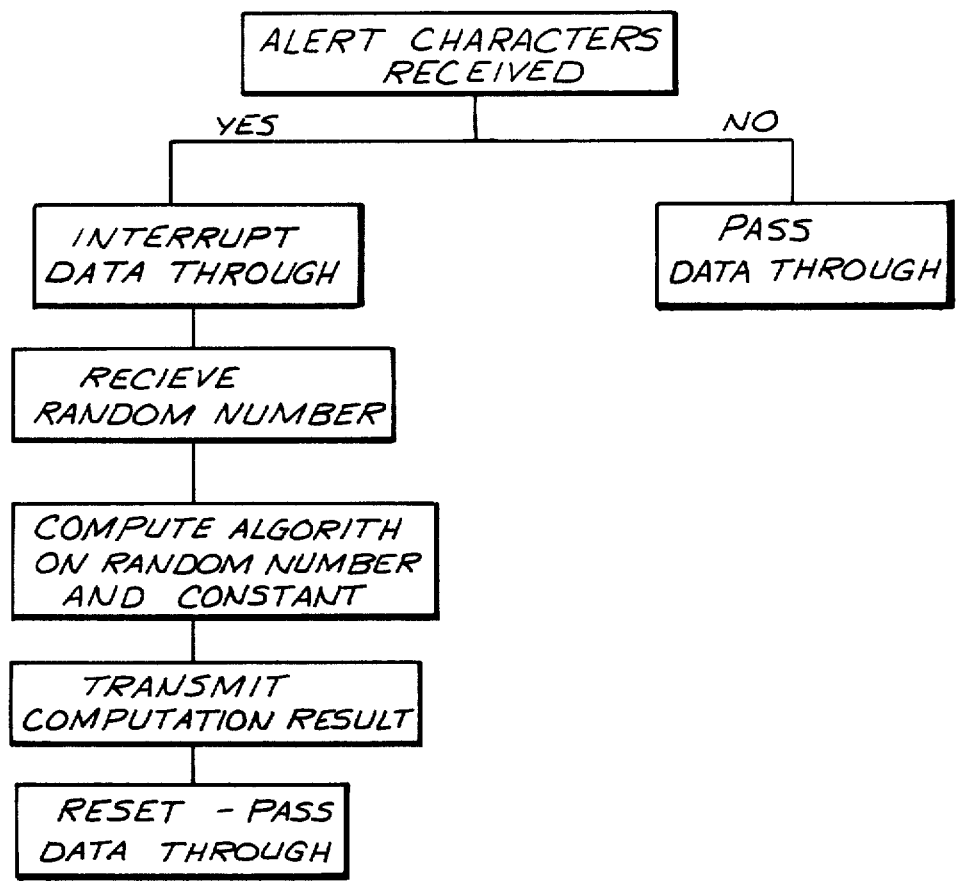
FIG. 5 is a data flow diagram relative to the remote verifying unit of FIG. 3.

Referring to FIG. 2, the base verifying unit 12 is interconnected between the computer 10 and the base modem 14 and includes the following standard interconnections between the computer and modem: Electronic Industry Associateion (EIA) standard control leads 22, send data line 24, receive date line 26, data terminal ready line 28 and carrier detect line 30. The base verifying unit 12 comprises a suitable known microprocessor 32, data memory 34, program memory 36, and controller 38. The microprocessor is appropriately programmed in accordance with the data flow diagram of FIG. 4 to attain the following operational description.

The controller 38 is connected to the receive data line 26 to monitor incoming data and is connected to the carrier detect line 30 to sense the presence or absence of a carrier detect signal. The controller 38 controls the switching of switches 40, 42 and 44. As shown in FIG. 2, the base verifying unit 12 is in a ready or set mode awaiting the initial communication from the remote user and the switches 40, 42, 44 perform the following functions. The switch 40 in the send data line 24 maintains the interconnection between the input terminal 46 and the output terminal 48 of the send data line. The switch 44 maintains the interconnection of the data terminal ready line 28 between the input terminal 50 and the output terminal 52 of the data terminal ready line 28. The switch 42 in the receive data line 26 is open to open circuit the receive data line between the input terminal 54 and the output terminal 56 to prevent or block data from reaching the computer prior to identity verification. In the alternate switching position, the switch 40 connects the send data output terminal to the controller to allow the controller to transmit data to the remote user, the switch 42 interconnects the input and output terminals 54, 56 of the receive data line 26 to allow data to pass from the remote user terminal to the computer, and the switch 44 connects the data terminal ready line output to the negative voltage terminal 45 (i.e., to a logical off condition) to thereby disconnect the remote user terminal and reset the base verifying unit 12 to receive another call.

The base verifying unit 12 also has a programming terminal 58 to permit programming of the microprocessor 32. A log communication module 60 is connected to the microprocessor 32 and provides a programable control card to control a serial output device such as a printer to be interconnected through terminal 62. The log module is used to record invalid entry attempts to the computer thereby indicating when a change in password or telephone number is desirable. In addition, the log module can be used to determine computer port usage.

Figure 3:
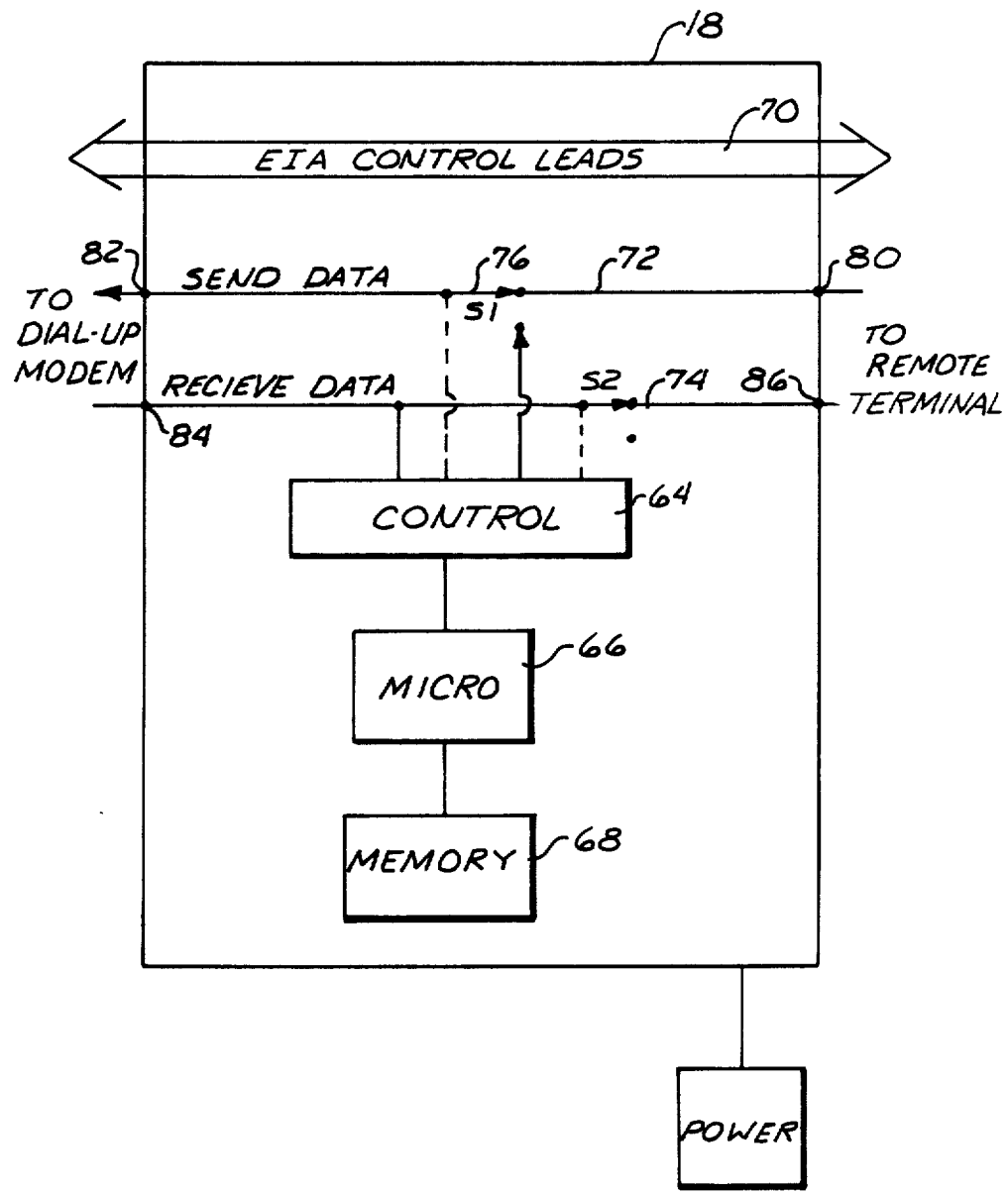
FIG. 3 is a block diagram of the remote verifying unit of the present invention.

Referring to FIG. 3, the remote verifying unit 18 comprises a controller 64, a microprocessor 66, memory 68, EIA control leads 70, send data line 72 and receive data line 74. The controller 64 controls the switches 76 and 78 and is interconnected to the receive data line to monitor the data received by the remote user terminal. In its ready or set mode, the remote verifying unit 18 is completely passive to normal operation of the modem and remote user terminal. The switch 76 in its ready or set mode maintains the interconnection of the send data line 72 between the input terminal 80 and the output terminal 82. In its alternate switching position, the switch 76 disconnects the remote user terminal from the send data line and connects the controller 64 to the output of the send data line. The switch 78 in its ready or set mode maintains the interconnection of the receive data line between the input terminal 84 and the output terminal 86. In its alternate switching position, the output of the receive data line connected to the remote terminal is open-circuited and the input of the receive data line is connected to the controller 64.

The base verifying unit 12 is programmed with a specific group of characters or number as a system identification, i.e., a constant "K", and a mathematic algorithm, i.e., $Y = f(K, X)$. The remote verifying unit 18 (and any other remote verifying units to be used in conjunction with the base verifying unit 12) is likewise programmed with the same constant K and the same algorithm. The base verifying unit is also programmed with a password "P".

In operation, the base verifying unit 12 as shown in FIG. 2 is in a ready or set mode so that the modem 14 may accept a telephone call. The remote user proceeds in a conventional manner through the steps necessary to establish communication up to the point where the remote user's modem sends a "carrier detect" signal to the remote user terminal indicating that the remote user terminal is on line. The switch 42 of the base verifying unit 12 is open to prevent any data from the remote terminal 16 from reaching the computer 10. At this point, the base verifying unit 12 is monitoring the receive data line 26 for the proper sequence of identifying characters, i.e. the password P. If an unauthorized sequence is received, i.e. an improper password, or if no sequence is timely forthcoming, the controller 38 causes the switch 44 to open and connect the data terminal ready line 28 output to ground. Grounding the data terminal ready line output causes the base modem 14 to disconnect the caller. Once the caller is disconnected, the carrier signal disappears causing the modem to turn off the carrier detect signal in accordance with conventional standards. The controller senses the absence of the carrier detect signal and resets to accept another call. The unauthorized entry attempt is recorded by the log printer.

If a valid password P is received, the controller 38 causes the microprocessor 32 to generate a group of random characters or number "X" and to perform the mathematical algorithm involving the constant K and the random number X, i.e., the microprocessor performs the algorithm $Y = f(K, X)$. The controller 38 causes switch 40 to connect the controller 38 to the send data line 24 output to enable the random number X to be sent to the remote verifying unit 18. The controller 38 first sends a predetermined group of characters to alert the remote verifying unit 18 that the random numbers is being sent and immediately thereafter sends the random number X.

Prior to reception of the alerting characters, the remote verifying unit 18 is completely passive to normal operation with the switches 76, 78 being closed to allow data to pass through on the send data line 72 and the receive data line 74. The controller 64 monitors the receive data line 74 and, only upon detection of the alerting characters, the controller 64 opens the switch 78 to open the receive data line to the remote terminal and the controller 64 receives the random number X. The controller 64 then causes the microprocessor 66 to perform the mathematical algorithm on the random number X, and the constant K, i.e., $Y' = f(K, X)$. Once the result Y' has been calculated, the controller 64 causes the switch 76 to connect the controller 64 to the send data line output enabling the transmission of the result Y' back to the base verifying unit 12. The controller 64 then returns switches 76, 78 to their normal ready position.

The resul Y' transmitted by the remote verifying unit 18 is received by the base verifying unit 12 on the receive data line 26 and the controller 38 causes the microprocessor 32 to compare the received result Y' with the result Y internally generated by the base verifying unit 12. If the results do not match or if a result is not timely received from the remote user terminal, the caller is disconnected as previously described. If the results match, i.e., $Y = Y'$, the microprocessor 32 instructs the controller 38 to send the message "continue" to the remote user terminal and actuates the switches 40, 42 to a closed position to permit data to pass through the base verifying unit 12 on the send data line 24 and the receive data line 26. The remote user terminal is now on line as though the base verifying unit 12 is not in the circuit. Upon normal disconnection of the remote user terminal after completion of its communication, the absence of a carrier detect signal will cause the controller 38 to reset the base verifying unit 12 to the ready or set mode to accept another call. Identity verification is relatively swift requiring only one or two seconds to complete.

Without a remote verifying unit, the unauthorized user cannot activate the base verifying unit to establish communication with the computer. Even if the authorized user has a remote verifying unit, it is necessary that the remote verifying unit have both the correct constant and the correct algorithm programmed therein. Because only a random number is transmitted by the base verifying unit, there is no way for the unauthorized user to determine the constant and/or algorithm from this transmitted number. Similarly, wire tapping an authorized user will not appreciably aid the unauthorized user to break the security system. Since the base verifying unit is located exterior to the computer 10 and isolates the computer from any signals from the remote user prior to verification, the unauthorized remote user cannot attempt submission of any passwords to the computer or attempt any "back door"

methods of access. Consequently, virtually foolproof security is provided.

In the event a remote verifying unit is lost or stolen, the base verifying unit and the remaining remote verifying units can be reprogrammed with different algorithms and/or different constants. Since call back is not required, the present security system saves user time, saves phone costs, and saves automatic dialer costs. Since the remote verifying unit is relatively small, it can easily be carried with portable remote user terminals.

As can be appreciated, the method of identify verification of the present invention has wide applicability in those instances where it is necessary to identify members of a group while positively excluding nonmembers of the group. In this regard, the method involves providing a constant and a mathematical function to each member of the group. The inquiring or challenging member can query another member by passing any random information to the queried member and then performing the mathematical function on the random information transmitted and the constant to obtain a result. The queried member performs the same mathematical function and, if it arrives at the same result and transmits it to the challenging member, it has identified itself properly to the challenging member and its identity has been suitably verified. Such a method of identity verification is compatible to many media of communication such as radio communication and its simplicity and speed of performance renders it desirable for time response sensitive environments such as combat environments. For example, such a method of identity verification can be used by combatants to identify friendly armaments such as tanks. With the proliferation of arms sales in the world, it is not uncommon for opposing combatants to have tanks and armaments made by the same country so that visual identification is unreliable or impossible.

Another area of particular utility of the present method of identity verification is encryption key management. That is, the present method may be utilized for passing encryption keys between two points. A major concern in data encryption is encryption key management. Such management involves insuring that an encrypt/decrypt key be provided to members of a group who are authorized to communicate among themselves to the exclusion of all nonmembers. Access to the key by someone outside the group is to be prevented so as to prevent eavesdropping on conversations by telephone lines, radio, etc. being held by members of the group. The method of the present invention for key transfer would eliminate the possibility that an outsider could gain access to the data encryption key by wire tapping, mail intercession, or by other means. In the present invention, the result of the mathematical computation is in fact the data encryption key. The method of transference is the same as described above for identity verification. A random number is generated and transmitted, and a mathematic algorithm is performed on the random number and constant with the result being the particular data encryption key for the upcoming communication. Since the data encryption key is not being sent, it cannot be compromised. In the present method, however, the result is not retransmitted to the sender for confirmation but rather is loaded into the receiver's decryption system for use in decrypting messages being encrypted by the sender. Accordingly, a new and improved method for encryption key transmission and management is provided.

As will be appreciated to persons skilled in the art, various modifications and adaptations of the structure and process above described will become readily apparent without departure from the spirit and scope of the invention, the scope of which is defined in the appended claims.

We claim:

1. A method for operating a remote user terminal for connection to a corresponding base computer requiring identity verification and for ready connection to other computer stations not requiring said identity verification comprising
   maintaining the remote user terminal in a ready operational condition allowing connection to said other computer stations,
   operating the remote user terminal to establish initial communication with the base computer, and verifying identity of said remote user terminal to said base computer by:
   providing the authorized remote user terminal with a programmed preselected mathematical algorithm and a selectively-variable predetermined constant,
   generating a random number at the base computer system to be accessed and transmitting the random number to the remote user terminal,
   performing the algorithm on the random number and the constant at the remote user terminal to calculate a first result,
   transmitting the first result from the remote user terminal to the base computer system,
   performing the algorithm on said random number and the constant at the base computer system to calculate a second result,
   comparing the first result and the second result, and granting access to the base computer when the first result matches the second result.

2. The method of claim 1 which comprises controllably varying the preselected constant.

3. The method of claim 1 which comprises receiving at the base computer system a preliminary predetermined password transmitted from the remote user terminal.

4. The method of claim 1 which comprises isolating the base computer from communication from the remote user terminal until said first result matches said second result.

5. The method of claim 1 wherein the base computer system has a base modem and the remote user terminal has a remote modem in communication with the base modem via a telephone call comprising: disconnecting the telephone call of the remote user at the base modem if the first result does not match the second result.

6. The method of claim 5 comprising disconnecting the telephone call of the remote user terminal if the first result is not timely received at the base computer system subsequent to transmitting the random number to the remote user terminal.

7. The method of claim 5 comprising:
   receiving at the base computer system a preliminary predetermined password transmitted from the remote user terminal preconditional to generating a random number, and
   disconnecting the telephone call of the remote user at the base modem if the preliminary predetermined password is not timely received at the base computer.

8. The method of claim 1 which comprises recording the receipt of a first result which does not match the second result.

9. In a computer system having a base computer, a base modem interconnecting the base computer to a telephone line, a remote user terminal, a remote modem for interconnecting the remote user terminal via a telephone line and the base modem to the base computer, a computer security system for verifying the identity of authorized remote user terminals to grant access to the base computer and denying access to unauthorized remote user terminals, comprising a base verifying unit and a cooperating remote verifying unit, said base verifying unit being interconnected between the base computer and the base modem for selectively conducting data between the computer and the base modem and having means for generating a random number and transmitting the random number to the remote verifying unit, means for providing a selectively-variable predetermined constant, means for performing a predetermined mathematical algorithm on the random number and the constant to calculate a first result, means for receiving a second result from the remote verifying unit and comparing the second result to the first result, and control means for controlling the conduction of data to the computer to prevent conduction of data from the remote user terminal to the computer absent the second calculated result matching the first calculated result and permitting conduction of data to the computer upon said second calculated result matching said first calculated result, said remote verifying unit being passive to operation of said remote terminal other than connection to said base computer and interconnected between the remote user terminal and the remote modem, said remote verifying unit having means for monitoring data from said remote modem to said remote terminal to determine a transmission of the random number from said base computer to said remote terminal, control means for maintaining the verifying unit passive to operation of said remote terminal other than connection to said base computer and for actuating the verifying unit for identity verification upon determining a transmission of the random number from said base computer to said remote terminal, means for receiving said random number from said base verifying unit, means for providing said selectively-variable predetermined constant, means for for performing said predetermined mathematical algorithm on said random number and said constant to calculate a second result, and means for transmitting said calculated second result to said base verifying unit.

* * * * *